TAPPED TORSIONAL DELAY LINES

Filed March 8, 1955 2 Sheets-Sheet 1

INVENTOR
W. P. MASON
BY
H. O. Wright
ATTORNEY

March 25, 1958 W. P. MASON 2,828,470

TAPPED TORSIONAL DELAY LINES

Filed March 8, 1955 2 Sheets-Sheet 2

INVENTOR
W. P. MASON
BY
H. O. Wright
ATTORNEY 2,828,470

TAPPED TORSIONAL DELAY LINES

Warren P. Mason, West Orange, N. J., assignor to Bell Telephone Laboratories, Incorporated, New York, N. Y., a corporation of New York Application March 8, 1955, Serial No. 493,025

8 Claims. (Cl. 333—30)

This invention relates to electromechanical transmission devices. More particularly, it relates to a novel method of tapping a torsional delay line, to novel forms of torsional electromechanical transducers and to improved forms of electromechanical delay lines which provide one or more taps or pickoff points along the line so that an input signal may be recovered at each tap or pickoff point, as well as at the far or output end of the line, the several recovered signals being delayed with respect to the input signal by different predetermined amounts.

This application is a continuation in part of applicant's copending application Serial No. 351,841, filed April 29, 1953, which matured into Patent 2,742,614 granted April 17, 1956.

Tapped delay lines have been used for numerous and varied purposes in the prior art, as described, for example, in United States Patent 1,955,471, granted April 17, 1934, to L. G. Pooler; in applicant's copending application Serial No. 187,419, filed September 29, 1950, which matured into Patent 2,711,515, granted June 21, 1955; and in the copending joint application of H. W. Bode and H. J. McSkimin, Serial No. 487,686, filed February 11, 1955.

Tapped electromechanical delay lines of the prior art have, however, usually been of the type illustrated in the above mentioned patent to Pooler, wherein it is necessary to break the mechanical delay element at each tap point and insert an electromechanical transducer as illustrated in Fig. 1 of said patent. Tapped electromechanical delay lines of the prior art have not proven very practical inasmuch as they are expensive to construct and involve relatively large losses and appreciable impedance irregularities at each tap point.

In accordance with the principles of the present invention, the objectionable features of prior art tapped electromechanical delay lines are avoided by employing a torsional delay line of the general type disclosed and claimed in applicant's copending application Serial No. 351,841, filed April 29, 1953, now Patent No. 2,742,614, granted April 17, 1956, of which this application is a continuation in part. This type of delay line comprises an elongated ferroelectric element, comprising principally barium titanate or potassium niobate or any of a number of other ferroelectric materials well known in the art, which does not require separate electromechanical transducers, the transducers, in effect, being built into the element itself by establishing at the desired positions a bidirectional polarization about a median longitudinal plane of the element and applying signal electrodes to the element which are substantially normal to the said median plane.

In accordance with the present invention such a torsional electromechanical delay line can be tapped at any point intermediate its ends, by establishing about said point the above mentioned bidirectional polarization and applying properly oriented signal electrodes at the intermediate point. The electrodes may comprise very thin conductive platings, the leads connecting to the electrodes may be made light in weight and flexible, and the homogeneous character of the ferroelectric element is substantially undisturbed so that no substantial losses or impedance irregularities are introduced and the tapping of the line can be easily and economically effected.

Another improved feature of delay lines of the invention is the enlargement of the end sections of the ferroelectric element to provide improved mechanical impedance match with the main portion of the element.

An alternative form of delay line of the invention, in which the transducers at each end of the line are of a particularly advantageous form and construtcion, is also disclosed hereinunder.

Principal objects of the invention are, accordingly, the elimination of losses and impedance irregularities and the structural simplification of tapped electromechanical delay lines.

Other principal objects are to decrease the cost and improve the performance and efficiency of tapped electromechanical delay lines.

Another principal object is to provide an improved method of tapping a torsional delay line.

Other and further objects of the invention will become apparent during the course of the detailed description of illustrative embodiments of the invention given hereinunder, and from the appended claims.

The principles of the invention, particular features thereof, and specific illustrative embodiments thereof will be described in detail below in connection with the accompanying drawings, in which.

Figure 1:
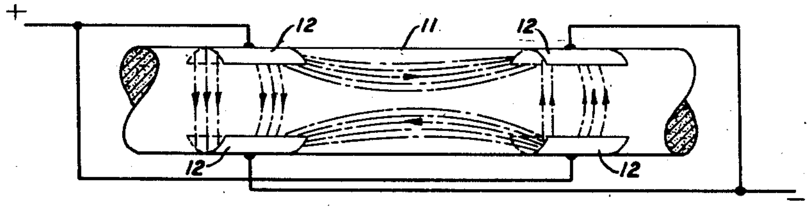
Fig. 1 illustrates diagrammatically the method of effecting the longitudinal, bidirectional polarization of a portion of a solid cylindrical ferroelectric element, employed as a delay line, about a particular point on the line intermediate its ends.

In more detail, Fig. 1 shows a portion of an elongated solid cylindrical member 11 of ferroelectric material having four electrodes 12 symmetrically applied about the center of the portion as shown. Diagonally opposed electrodes 12 are connected to the opposite terminals of a direct potential source so that the electric field which will exist between them within the ferroelectric material will have the form indicated by the fine broken lines and small arrows as shown in Fig. 1.

The area covered by the electrodes 12 is not critical. Each electrode may, by way of example, extend in width approximately a quarter way around the circumference of the member 11 and for a length along the longitudinal axis of member 11 that is approximately equal to the above mentioned width. The distance between the two pairs of electrodes 12 along the delay line 11 should be at least one half wavelength of the mechanical wave to be transmitted along the delay line.

Since the electrodes 12 serve solely to effect a desired polarization of that portion of element 11 included between them, they should be applied in such fashion that they may be easily removed after polarization has been accomplished. The electrical potential which should be applied between the pairs of electrodes depends upon their separation and upon the ease with which the particles of the particular ferroelectric material employed can be oriented. Simultaneously with the application of the polarizing voltage, the element 11, if composed principally of the substance barium titanate, is heated above its Curie temperature, that is, the temperature above which the material ceases to be ferroelectric, in order to facilitate aligning the particles with the electric field. By way of example, for a ceramic composed of more than eighty percent barium titanate, a field strength of approximately thirty volts per mil of electrode separation, applied while the temperature of the ceramic is above the Curie temperature (substantially 130 degrees centigrade) has been found satisfactory. After polarization the ferroelectric material is slowly cooled with the electric field still applied until approximately room temperature has been reached. Electrodes 12 may then be removed.

In the event that the element 11 is composed principally of potassium niobate, polarization should be effected at a temperature well below its Curie temperature, as is specifically taught and claimed in applicant's copending application Serial No. 283,913, filed April 23, 1952, which matured into Patent 2,706,326, granted April 19, 1955.

Figure 2:
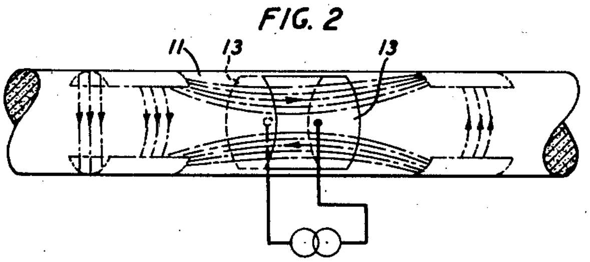
Fig. 2 illustrates the positioning of the signal electrodes at the point about which longitudinal, bidirectional polarization has been effected in accordance with Fig. 1.

Fig. 2 shows, by way of illustration, the portion of element 11 of Fig. 1 with electrodes 12 removed and with signal electrodes 13 in position for operation. In general the diameter of the delay line should be substantially one half wavelength of the mechanical wave to be transmitted along it and the electrodes 12 and 13 should extend longitudinally along the delay line for a length substantially equal to the diameter of the delay line. Assuming that the fine broken lines and small arrows shown in Figs. 1 and 2 represent the bidirectional polarization of the element 11, each of the signal electrodes 13 is applied to the cylinder so that it is symmetrically located with respect to the two portions of the bidirectional polarization and with respect to a horizontal longitudinal plane bisecting the element 11 in the position as shown in Fig. 2. Accordingly, electrodes 13 are placed on opposite sides of the cylindrical element 11 and equally distant from the positions occupied by the polarizing electrodes 12 during the process of polarization, the signal electrodes 13 being displaced angularly from the positions of electrodes 12 by ninety degrees. The two like electrodes 13 should cover from thirty to eighty percent of the circumference of the cylindrical element 11, depending upon the value of shunt capacity desired between them for any particular application. These electrodes are preferably, but not necessarily, deposited upon the cylindrical element 11 by evaporation, since it is desirable to keep their masses and mechanical losses as low as possible. By the same token, leads employed to make connections with electrodes 13 should be relatively light weight and as flexible as practicable, in order to avoid contributing any appreciable mechanical loss as the element 11 undergoes torsional vibration.

Figure 3A:
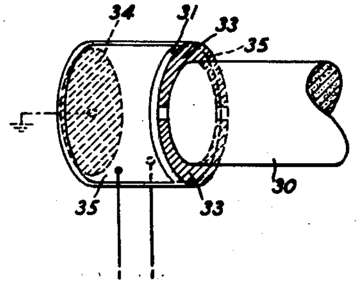
Figs. 3A and 3B illustrate the method of effecting the longitudinal, bidirectional polarization and of applying the signal electrodes at the ends of an illustrative delay line of the invention, such as that which is shown in full in Fig. 4.
Figure 3B:
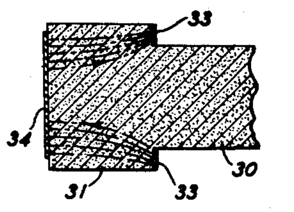

As will be explained in further detail in connection with the illustrative embodiment shown in Fig. 4, the end portions of the ferroelectric element 11 are, in one form of the invention, preferably enlarged in diameter by, for example, forty percent as shown in Figs. 3A and 3B. This has been found to improve the mechanical impedance match between the transducer portions formed at the ends of element 11 and the remainder of element 11.

In Figs. 3A and 3B, an end portion 31 of the ferroelectric delay line 30 is shown and, as mentioned above, is substantially forty percent greater in diameter than the main portion 30 of the element. The length of the portion 31, parallel to its cylindrical axis, is preferably one half wavelength of the torsional wave energy to be transmitted along line 30.

The bidirectional polarization of the end portion 31 can be effected by using two electrodes 33 (upper and lower) on the right vertical surface of portion 31 as shown in Fig. 3A and a single disc electrode 34 on the left or free end of the portion 31.

Polarization is then effected by connecting a voltage source of appropriate magnitude between the lower electrode 33 and electrode 34 in the direction to cause electrode 34 to be positive with respect to the lower electrode 33. Upper electrode 33 and electrode 34 are connected across a similar voltage source, but in this instance the upper electrode 33 should be positive with respect to electrode 34. The element 30, if principally of barium titanate, is then heated above its Curie temperature and allowed to cool slowly to substantially room temperature with the above mentioned polarizing voltages maintained, precisely as described in connection with the polarization of the portion of element 11, of Fig. 1 above.

When the polarization of the end portion 31 has been effected, as just described, the electrodes 33 and 34 are removed and signal electrodes 35 are applied to the end portion 31. As for electrodes 13 of Fig. 2, the electrodes 35 of Fig. 3A should be rotated with respect to the positions of electrodes 33 by an angle of ninety degrees and electrodes 35 may cover from thirty to eighty percent of the cylindrical surface of portion 31, depending upon the shunt capacity desired between them in any particular instance.

Figure 4:
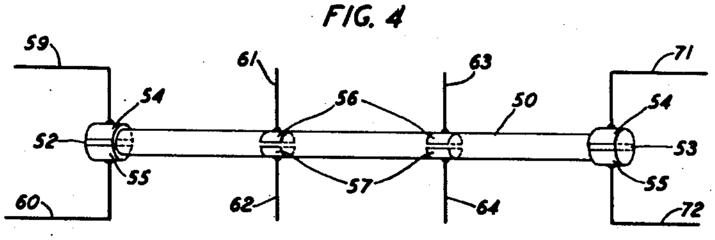
Fig. 4 illustrates a tapped electromechanical delay line of the invention.

In Fig. 4 a tapped electromechanical delay line of the invention is shown and comprises an element of ferroelectric material 50 having enlarged end portions 52 and 53. The central portion of element 50 as well as the end portions 52 and 53 are preferably cylindrical, the diameter of the end portions being substantially forty percent greater than that of the central portion. The reasons for this are as follows:

When one designs a torsional transducer as an electromechanical wave filter, it can be shown that the mechanical wave impedance of the device is equal to $$Z_M=\frac{\pi}{2}Z_0\left(\frac{f_2-f_1}{f_m}\right) \quad (1)$$

where $$Z_0=\frac{\pi}{2}R^4\sqrt{\rho\mu} \quad (2)$$

and where $Z_0$ is the characteristic impedance of the material of the transducer and $(f_2-f_1)/f_m$ is the ratio of the bandwidth to the mean frequency of the band. In Equation 2, R is the radius of the cylindrical transducer, $\rho$ the density and $\mu$ the shear modulus of the transducer material. The percentage bandwith, i. e., $(f_2-f_1)/f_m$ is determined by the electromechanical coupling factor $k$ according to the equation $$\frac{f_2-f_1}{f_m}\doteq\sqrt{\frac{8}{\pi^2}\frac{k^2}{1-k^2}} \quad (3)$$

In the construction of Fig. 3A, coupling factors of 0.18 have been realized. Hence $$\frac{f_2-f_1}{f_m}=0.165 \quad (4)$$

In order that the driving impedance of the transducer matches the characteristic impedance $Z_0'$ of the line $$Z_0'=\frac{\pi}{2}r^4\sqrt{\rho\mu} \quad (5)$$

Where $r$ is the radius of the line, we must have $$\frac{R^4}{r^4}=\frac{2}{\pi}\frac{1}{0.165} \quad (6)$$

or $$\left(\frac{R}{r}\right)=\sqrt[4]{3.85}=1.40 \qquad (7)$$

By way of example, where the diameter of the delay line is 100 mils, the diameters of each of the enlarged end portions should be 140 mils.

The end portions 51 and 53 have electrode platings 54 and 55 applied to them in substantially the manner described above for electrodes 35 in connection with Fig. 3A. The central portion of element 50 has several pairs of electrodes 56 and 57 applied to it at intervals as shown. Each pair of such electrodes 56, 57 is applied symmetrically about the center point of a portion of element 50 which has previously been bidirectionally polarized as described in detail for the portion of element 11 shown in Fig. 1, the electrodes 56, 57 being displaced ninety degrees around element 50 from the positions occupied by the polarizing electrodes during the polarizing process. Light, flexible, conductive, leads 61, 62 and 63, 64 are electrically connected to the respective pairs of electrodes 56, 57 as shown in Fig. 4, preferably by spot soldering. The spacings between successive pairs of electrodes 56, 57 and between each pair of end electrodes 54, 55 and the nearest pair of electrodes 56, 57 are chosen to afford predetermined delays between the application of an electrical signal at the left end electrodes 54, 55 and its recovery at each particular pair of electrodes 56, 57. For example, the velocity of transmission of a torsional wave along a cylindrical rod of barium titanate, assuming a diameter of 100 mils and a frequency of 600 kilocycles, is such that a delay of ten microseconds will be encountered between successive pairs of electrodes spaced 3.3 centimeters (or 1.30 inches) apart along the rod. Thus for the structure of Fig. 4, assuming a spacing of 3.3 centimeters between each successive pair of electrodes, a signal pulse applied to the left end electrodes 54, 55 will arrive at the first pair of tap electrodes 56, 57 after a delay of ten microseconds, at the second pair of tap electrodes 56, 57 after a delay of twenty microseconds, and at the right end electrodes 54, 55 after a delay of thirty microseconds.

Figure 5:
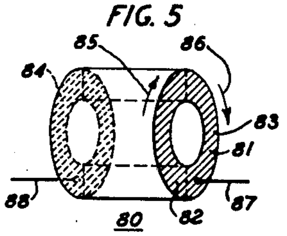
Figs. 5 and 6 show alternative forms of bidirectionally polarized transducers suitable for use as terminal transducers with torsional delay lines of the invention.
Figure 6:
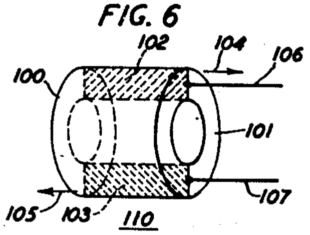

In lieu of employing the enlarged end portions 52 and 53 of Fig. 4, these enlarged end portions may be removed and transducers of either of the two types illustrated in Figs. 5 and 6, respectively, may be cemented directly on the ends of the central portion 50.

The transducer 80 of Fig. 5 comprises two hemicylindrical portions 82 (front) and 81 (back), each of which, prior to joining them to form the complete cylindrical transducer, has been polarized circumferentially. The two portions are then assembled with their respective polarizations in the same direction circumferentially so that the polarizations on opposite sides of the median vertical plane including the interfaces between the two hemicylindrical portions as shown in Fig. 5 are in opposite directions, as indicated by arrows 85 and 86, respectively.

Polarization of each hemicylindrical portion is effected by placing electrodes on the longitudinal edges of the portion, impressing a suitable voltage across the electrodes, heating the element above its Curie temperature (assuming the element is composed principally of barium titanate) and then slowly cooling to room temperature with the polarizing voltage still applied, precisely as described hereinabove for polarizing other portions of the delay lines.

After cooling, the polarizing voltage and polarizing electrodes are removed and the two hemicylindrical portions are assembled (with polarizations opposed as described above) and firmly cemented together after which signal electrodes 83, 84 are applied over both the entire ring-shaped ends of the assembly and terminal leads 87, 88 are electrically connected to the signal electrodes, respectively, as shown in Fig. 5. The completed transducer is then firmly cemented to the end of the torsional delay line as a driving, or terminal, electromechanical torsional wave transducer.

By obvious application of Equation 1 given, hereinabove, assuming the main delay line or rod to be of barium titanate (for example, rod 50 of Fig. 4) and 100 mils in diameter, the transducer assembly of Fig. 5 when also constructed of barium titanate will substantially match the impedance of the line 50 if it is given a length of one half wavelength of the torsional energy to be transmitted, an external diameter of 125 mils and an internal diameter of 62.5 mils.

More specifically the detailed calculations are as follows:

The mechanical impedance of the delay line is by Equation 5, above, $$Z_0'=\frac{\pi}{2}r^4\sqrt{\rho_1\mu_1} \qquad (8)$$

where $r$ is the radius of the delay line and $\rho_1$ and $\mu_1$ are the density and shear modulus, respectively, of the delay line.

The mechanical impedance of the transducer, by modification of Equation 1 above, is $$Z_M=\frac{\pi}{2}\left[\frac{\pi}{2}(R_2^4-R_1^4)\sqrt{\rho_2\mu_2}\right]\left(\frac{f_2-f_1}{f_m}\right) \qquad (9)$$

where $R_1$ and $R_2$ are the internal and external radii, respectively, of the transducer, $\rho_2$ and $\mu_2$ are the density and shear modulus, respectively, of the transducer and $$\left(\frac{f_2-f_1}{f_m}\right)$$

is determined by the electromechanical coupling factor $k$ of the transducer in accordance with Equation 3 given hereinabove. Factor $k$, for transducers of the types illustrated in Figs. 5 and 6, is substantially .30 so that $$\left(\frac{f_2-f_1}{f_m}\right) \text{ is } 2.84$$

Assuming the same material to be used in the transducer as in the delay line, $\rho_1=\rho_2$ and $\mu_1=\mu_2$.

It is also assumed that $R_2=2R_1$.

Bearing the above data in mind, by equating $Z_M$ to $Z_0'$ and dropping corresponding like factors $$\frac{\pi}{2}(R_2^4-R_1^4)2.84=r^4 \qquad (10)$$

$$\frac{\pi}{2}\frac{15}{16}R_2^4 2.84=r^4 \qquad (11)$$

$$\left(\frac{R_2}{r}\right)^4=\frac{2}{\pi}\frac{16}{15}\frac{1}{2.84}=2.34 \qquad (12)$$

$$\frac{R_2}{r}=1.25 \qquad (13)$$

The transducer 110 of Fig. 6 can be of barium titanate and of the same physical dimensions as the transducer 80 of Fig. 5 and can be employed in the same manner. The transducer 110 of Fig. 6 differs from transducer 80 of Fig. 5 only in that its two halves are longitudinally polarized in opposite directions as indicated by arrows 104, 105 of Fig. 6 and its electrodes are thin conductive coatings 102, 103 along the longitudinal joining edges of the front and back halves 101, 100, as indicated in Fig. 6. The electrodes 102, 103 are, conveniently, composed of an electrically conductive cement, such as araldite. Terminal leads 106, 107 are provided for making electrical connections to electrodes 102, 103, respectively, as shown.

Figure 7:
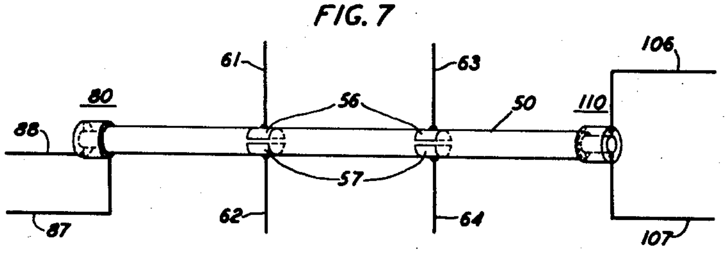
Fig. 7 shows a tapped torsional delay line of the invention employing transducers of the type illustrated in Figs. 5 and 6.

Fig. 7 illustrates a tapped torsional delay line of the invention employing transducers of the types shown in Figs. 5 and 6 as described in detail above, firmly cemented to the left and right ends, respectively, of a torsional delay line 50, both the transducers and delay line 50 being, for example, of barium titanate. Electrode pairs 56, 57, and their associated conductive leads 61 through 64, provide for tapping delay line 50 in the manner described for the like designated structural features of Fig. 4. The device of Fig. 7 is the same as that shown in Fig. 4 and described in detail above except that the transducers 80 and 110 of Fig. 7 replace the enlarged end portions 52 and 53 of Fig. 4, respectively. The over-all assembly of Fig. 7 will be somewhat more efficient than that of Fig. 4 since the transducers 80 and 110 have an appreciably greater coupling factor or coefficient (i. e., coefficient of conversion of electrical to torsional mechanical wave energy or vice versa). For example, transducers 80 and 110 will each have a coupling factor or coefficient of substantially 0.30 as compared with substantially 0.18 for the enlarged end portions having the "built-in" transducer arrangements of Fig. 4.

Numerous and varied arrangements within the spirit and scope of the principles of the present invention will readily occur to those skilled in the art. By way of example, delay lines of square cross-sectional shape or of numerous other non-round cross-sectional shapes may obviously be employed in structures embodying the principles of the present invention. The above described illustrative embodiments by no means exhaustively cover all applications of said principles.

What is claimed is:

1. An electromechanical torsional delay line comprising an elongated rod-like solid member of ferroelectric material having a length many times its maximum cross-sectional dimension and having, near each end and at at least one position intermediate the said ends, discrete regions of longitudinal bidirectional particle polarization, the length of each said region being at least equal to a half wavelength of the torsional energy wave to be transmitted, the polarization being in one direction on one side of a substantially median longitudinal plane through said member and in the opposite direction on the other side of said plane, and a pair of signal electrodes symmetrically located about the center of each said bidirectionally polarized region, said electrodes being parallel to said polarizations and normal to said median plane, whereby torsional mechanical vibrations corresponding to an electrical signal, applied to a pair of said electrodes at one end of said device may be transmitted along said member and be reconverted to electrical signals corresponding to said applied signal at each of the other regions of longitudinal bidirectional polarization along said member.

2. The delay line of claim 1, each end of said elongated member of ferroelectric material being enlarged for a longitudinal distance of substantially one half wavelength of the torsional wave energy to be transmitted along said member, each said enlarged end being bidirectionally polarized with respect to a median longitudinal plane and having a pair of electrodes oppositely disposed, parallel to said polarizations and normal to said median plane, the mechanical impedance of each said enlarged end section matching the mechanical impedance of the main portion of the delay line.

3. The method of tapping a long torsional delay line of ferroelectric material at a point intermediate its ends, which comprises bidirectionally polarizing a portion of said delay line substantially centered about said point so that said portion is longitudinally polarized in one direction on one side of a substantially central longitudinal plane of said portion and longitudinally polarized in the opposite direction on the other side of said longitudinal plane and applying a pair of electrodes to said line symmetrically with respect to said point and said polarizations and normal to said longitudinal plane.

4. An electromechanical transducer for driving a torsional delay line, said transducer comprising two like hemicylindrical portions, each of said portions having an outer diameter substantially twice its inner diameter and a longitudinal length of substantially one half wavelength of the torsional wave energy to be transmitted, each of said hemicylindrical portions being separately polarized circumferentially in a predetermined direction, the two polarized portions being cemented together with their respective polarizations in opposed relation to each other with respect to the median plane including the interfaces between said hemicylindrical portions, and electrode means for impressing a signal voltage longitudinally along both said portions in a direction normal to their respective directions of polarization.

5. An electromechanical torsional delay line comprising an elongated rod-like solid member of ferroelectric material having a length many times its maximum cross-sectional dimension and having input and output electromechanical torsional transducers at opposite ends of said member, respectively, said member having at at least one position intermediate its ends and displaced an appreciable distance from the nearer end a discrete region of longitudinal bidirectional particle polarization, the length of said region being at least equal to one half wavelength of the torsional energy wave to be transmitted, the polarization being in one direction on one side of a substantially median longitudinal plane through said member and in the opposite direction on the other side of said plane, and a pair of signal electrodes symmetrically located about the center of said bidirectionally polarized region, said electrodes being parallel to said polarizations and normal to said plane.

6. The delay line of claim 5 one of said electromechanical transducers comprising two like hemicylindrical portions, each of said portions having an outer diameter substantially twice its inner diameter and a longitudinal length of substantially one-half wavelength of the torsional wave energy to be transmitted, each of said hemicylindrical portions being separately polarized circumferentially in a predetermined direction, the two polarized portions being cemented together with their respective polarizations in opposed relation to each other with respect to the median plane including the interfaces between said hemicylindrical portions, and electrode means for impressing a signal voltage longitudinally along both said portions in a direction normal to their respective directions of polarization, said transducer being firmly cemented to one end of said delay line.

7. The combination of claim 6 in which both said line and said transducer are of circular cross section, the outer diameter of said transducer being twenty-five percent greater than the diameter of said line.

8. The delay line of claim 5 in which said transducers comprise enlarged portions of said member of ferroelectric material at each end of said member, said enlarged portions and the intermediate portion of said member being cylindrical, the diameter of the enlarged portions being forty percent greater than the diameter of the intermediate portion, each of said enlarged portions being bi-directionally, longitudinally polarized about a substantially median longitudinal plane of the portion and having a pair of oppositely disposed electrodes symmetrically positioned on said enlarged portion with respect to said polarization, said electrodes being parallel to said polarization and normal to said median plane.

No references cited.